(12) United States Patent
Youk et al.

(10) Patent No.: US 9,580,566 B2
(45) Date of Patent: *Feb. 28, 2017

(54) ORIENTED FILM

(71) Applicant: LG CHEM, LTD., Seoul (KR)

(72) Inventors: Kyung Seog Youk, Daejeon (KR);
Seung Young Park, Daejeon (KR);
Jung Min Sohn, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/437,782

(22) PCT Filed: Dec. 4, 2013

(86) PCT No.: PCT/KR2013/011171
§ 371 (c)(1),
(2) Date: Apr. 22, 2015

(87) PCT Pub. No.: WO2014/088320
PCT Pub. Date: Jun. 12, 2014

(65) Prior Publication Data

US 2015/0259486 A1    Sep. 17, 2015

(30) Foreign Application Priority Data

Dec. 4, 2012  (KR) .................. 10-2012-0139687
Dec. 4, 2013  (KR) .................. 10-2013-0149759

(51) Int. Cl.
*C08J 5/18* (2006.01)
*C08G 63/664* (2006.01)
(Continued)

(52) U.S. Cl.
CPC ................ *C08J 5/18* (2013.01); *C08G 18/48* (2013.01); *C08G 63/08* (2013.01); *C08G 63/66* (2013.01);
(Continued)

(58) Field of Classification Search
CPC ....... C08G 63/664; C08J 5/18; C08J 2367/04; Y10T 428/31565; Y10T 428/31551
(Continued)

(56) References Cited

U.S. PATENT DOCUMENTS 2,956,961 A * 10/1960 Kibler .................. C08G 18/423
427/373
4,826,945 A *  5/1989 Cohn ..................... A61K 47/34
424/423

(Continued)

FOREIGN PATENT DOCUMENTS

CA      2824959 A1    8/2012
EP      1642921 A1    4/2006
(Continued)

*Primary Examiner* — Maria Veronica Ewald
*Assistant Examiner* — Travis Figg
(74) *Attorney, Agent, or Firm* — Dentons US LLP

(57) ABSTRACT

The present invention relates to a oriented film having excellent mechanical physical properties and more improved flexibility and elongation to be preferably usable as a packaging film, and the like, wherein the oriented film includes: a lactide copolymer including two or more block copolymer repeating units in which hard segments of polylactide repeating units are bound to both ends of soft segments of polyether polyol repeating units, the block copolymer repeating units being linked with each other, and a slope of a stress-strain curve at a section having a strain of 0 to 16% is 0.5 to 1.1.

11 Claims, 3 Drawing Sheets

(51) Int. Cl.
*C08G 18/48* (2006.01)
*C08G 63/08* (2006.01)
*C08G 63/66* (2006.01)

(52) U.S. Cl.
CPC ......... *C08G 63/664* (2013.01); *C08J 2367/04* (2013.01); *C08J 2471/02* (2013.01)

(58) Field of Classification Search
USPC ........... 428/212–220, 423.1, 423.7; 424/422; 525/418
See application file for complete search history.

(56) References Cited

U.S. PATENT DOCUMENTS

2014/0037931 A1* 2/2014 Yoo ............................ C08J 5/18
428/220
2014/0154489 A1    6/2014 Sohn et al.

FOREIGN PATENT DOCUMENTS

| | | |
|---|---|---|
| EP | 2719714 A2 | 4/2014 |
| JP | 6-336523 | 12/1994 |
| JP | 08-027256 | 1/1996 |
| JP | 09-143239 | 6/1997 |
| JP | 1135655 A | 2/1999 |
| JP | 2000-230029 A | 8/2000 |
| JP | 2003-155334 A | 5/2003 |
| JP | 2007-522274 A | 8/2007 |
| JP | 2009203296 A | 9/2009 |
| KR | 6-336523 | 12/1994 |
| KR | 10-2010-0036872 A | 4/2010 |
| KR | 10-2010-0091092 A | 8/2010 |
| KR | 10-2011-0025730 | 3/2011 |
| KR | 10-2011-0079611 | 7/2011 |
| KR | 10-2011-0082702 | 7/2011 |
| KR | 10-2011-0114602 | 10/2011 |
| KR | 10-2012-0013707 | 2/2012 |
| KR | 10-2012-0049102 | 5/2012 |
| KR | 10-2012-0060571 | 6/2012 |
| KR | 10-2012-0094552 A | 8/2012 |
| KR | 20120094552 A * | 8/2012 |
| KR | 10-1191967 | 10/2012 |
| KR | 10-2012-0135890 A | 12/2012 |
| WO | 2012/064043 A2 | 5/2012 |
| WO | 2012/169790 A2 | 12/2012 |

* cited by examiner

ORIENTED FILM

This application is a National Stage Entry of International Application No. PCT/KR2013/011171 filed Dec. 4, 2013, which claims priority to and benefit of Korean Application Nos. 10-2012-0139687 filed Dec. 4, 2012 and 10-2013-0149759 filed Dec. 4, 2013, in the Korean Intellectual Property Office, both of which are incorporated herein by reference.

TECHNICAL FIELD

The present invention relates to an oriented film capable of having excellent mechanical physical properties, and the like, and more improved flexibility and elongation to be preferably usable as a packaging film, and the like.

BACKGROUND

A polylactide (or polylactic acid) resin is a kind of a resin including repeating units represented by General Formula below. Unlike existing crude oil-based resins, the polylactide resin is based on biomass, which is usable as a renewable resource, and less discharges $CO_2$ which is a global warming gas, in production, as compared to the existing resins, and has appropriate mechanical strength corresponding to the existing crude oil-based resin, together with eco-friendly characteristics such as biodegradability by moisture and microorganisms when being buried.

[General Formula]

The polylactide resin is generally used as disposable packaging/containers, coatings, foamings, films/sheets, fibers, and the like. However, when the polylactide resin, or a copolymer including the same are processed to be a film form and used as a packaging film, and the like, there are disadvantages in that the polylactide resin, or a copolymer including the same is weak against impact and flexibility is deteriorated. In particular, due to deteriorated flexibility, extremely large noise occurs at the time of manufacturing the polylactide resin to be a film form, which has limitation in actual commercialization.

Accordingly, various methods such as adding various components which are possible to provide flexibility to the polylactide resin, mixing the polylactide resin with other resins, and the like, have been considered. However, in the most cases, there are still problems in that the product cost may be largely increased, flexibility may not be sufficiently achieved, and the like. In some cases, transparency, mechanical physical properties, or the like, of the film may be deteriorated.

Therefore, development of the film including the polylactide-based resin capable of exhibiting more improved flexibility while having excellent biodegradability and mechanical physical properties to be usable as a packaging film, and the like, has been continuously demanded.

SUMMARY OF INVENTION

The present invention provides an oriented film capable of exhibiting biodegradability and having excellent mechanical physical properties and more improved flexibility and elongation to be preferably usable as a packaging film, and the like.

An exemplary embodiment of the present invention provides an oriented film including:

a lactide copolymer including two or more block copolymer repeating units in which hard segments of polylactide repeating units are bound to both ends of soft segments of polyether polyol repeating units, the block copolymer repeating units being represented by Chemical Formula 1, and being linked with each other, wherein a slope of a stress-strain curve at a section having a strain of 0 to 16% is 0.5 to 1.1:

[Chemical Formula 1]

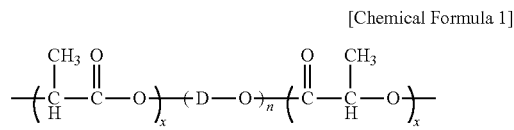

in Chemical Formula 1, D is a C2 to C10 linear or branched alkylene group, x is each independently an integer of 30 to 500, and n is an integer of 30 to 1000.

Hereinafter, the oriented film, and the like, according to a specific exemplary embodiment of the present invention is described in more detail.

According to an exemplary embodiment of the present invention, there is provided an oriented film including: a lactide copolymer including two or more block copolymer repeating units in which hard segments of polylactide repeating units are bound to both ends of soft segments of polyether polyol repeating units, the block copolymer repeating units being represented by Chemical Formula 1, and being linked with each other, wherein a slope of a stress-strain curve at a section having a strain of 0 to 16% is 0.5 to 1.1:

[Chemical Formula 1]

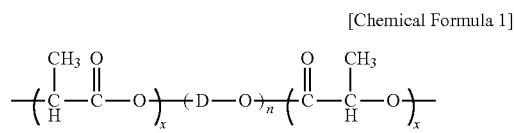

in Chemical Formula 1, D is a C2 to C10 linear or branched alkylene group, x is each independently an integer of 30 to 500, and n is an integer of 30 to 1000.

The oriented film according to an exemplary embodiment includes the lactide copolymer satisfying predetermined structural characteristics, and the like.

The lactide copolymer may include the block copolymer repeating units in which the hard segments of the polylactide repeating units are bound to the both ends of the soft segments of the polyether polyol repeating units derived from polyalkylene glycol, or the like, the block copolymer repeating units being represented by Chemical Formula 1. In addition, the lactide copolymer may include two or more, that is, a plurality of the block copolymer repeating units linked with each other.

According to a structure of the block copolymer repeating units of the lactide copolymer and the linking structure of these repeating units, the lactide copolymer may include a predetermined number of soft segments to exhibit excellent flexibility as compared to a polylactide resin or a lactide copolymer known in the art. In addition, the soft segments for improving flexibility may be bound in the lactide copolymer with the above-described linking structure, which decreases a possibility in which the soft segments are discharged while being processed or used. Therefore, the oriented film including the lactide copolymer according to an exemplary embodiment may exhibit and maintain excellent flexibility and elongation which are appropriate for being used as a packaging film, and the like.

In addition, the block copolymer units may be linked with each other via the urethane linking group, and the like, to be described below, and therefore, the lactide copolymer may be easily prepared and provided so as to have a larger molecular weight. Therefore, the oriented film including the lactide copolymer according to an exemplary embodiment may have excellent mechanical physical properties. In addition, due to the linking structure thereof, the molecular weight of the lactide copolymer, and the physical properties of the oriented film accordingly may be easily controlled.

Further, when measuring and deducing a stress-strain curve of the oriented film including the lactide copolymer according to an exemplary embodiment, a slope of the stress-strain curve at the section having a strain of about 0 to 16% may be about 0.5 to 1.1, or about 0.7 to 1.0, or about 0.8 to 0.95.

Here, the stress-strain curve of the oriented film may be measured and deduced by using Universal Testing Machine (UTM) (manufactured by Instron) according to ASTM D 882. The stress-strain curve of the deduced oriented film may be shown as FIGS. 2 and 3, and the slope of the stress-strain curve may be obtained by linear regression of the curve at a section having a strain of about 0 to 16% (for example, a section of about 0 to 16% in an X axis of FIG. 2). An example of the measured slope is shown in FIG. 3.

It is confirmed that in an initial strain section, the slope of the stress-strain curve has a relatively small value of about 0.5 to 1.1, and the oriented film according to an exemplary embodiment of the present invention has remarkably high elongation, low modulus, and excellent flexibility accordingly as compared to oriented films of a polylactide resin known in the art. Due to excellent flexibility, the oriented film according to an exemplary embodiment may solve problems of films of the existing polylactide resin, and may exhibit excellent flexibility, which is significantly preferably usable as a packaging film, and the like.

The slope characteristic of the stress-strain curve of the oriented film according to an exemplary embodiment of the present invention may be achieved by the above-described structural characteristics of the lactide copolymer, additional structural characteristics of the lactide copolymer, forms of the oriented film, or the like, to be described below.

Eventually, the oriented film according to an exemplary embodiment of the present invention includes the lactide-based copolymer to exhibit specific biodegradability, excellent mechanical physical properties, more improved flexibility, and the like, which may be significantly preferably usable as a packaging film, and the like.

DESCRIPTION OF EMBODIMENTS

Hereinafter, the lactide copolymer and the oriented film including the same as a major component will be described in more detail.

As described above, the lactide copolymer included in the oriented film according to an exemplary embodiment of the present invention as a major component may include two or more block copolymer repeating units in which the hard segments of the polylactide repeating units are bound to both ends of the soft segments of the polyether polyol repeating units, the block copolymer repeating units being linked with each other.

In the lactide copolymer, the block copolymer repeating units may be linked with each other via a urethane linking group. The urethane linking group may be induced from the polyvalent isocyanate compound having 2 or more equivalents of an isocyanate group per a molecule, and for example, the urethane linking group may include two or more of urethane bonds obtained by a reaction of a terminal hydroxy group derived from the polylactide repeating unit and the polyvalent isocyanate compound. That is, the block copolymer repeating units may be linked with each other by two or more of the urethane bonds included in the urethane linking group.

More specifically, the polyvalent isocyanate compound for forming the urethane linking group may be an isocyanate compound having more than about 2, or more than about 2 to less than 3, or about 2.1 to 2.9, or about 2.2 to 2.8 equivalents of an average isocyanate group per a molecule.

Here, a compound having more than about 2, or more than about 2 to less than 3 equivalents of an average isocyanate group per a molecule may include a mixture (for example, an equivalent of an average isocyanate group per a molecule=more than 2 to less than 3, or the like) of a diisocyanate compound having two isocyanate groups per a molecule (an equivalent of an average isocyanate group per a molecule=2) and a polyvalent isocyanate compound having 3 or more isocyanate groups per a molecule (an equivalent of an average isocyanate group per a molecule=3 or more). In one example, one urethane linking group derived from the polyvalent isocyanate compound may include a linear linking group including 2 urethane bonds and a branched linking group including 3 or more urethane bonds.

Therefore, the plurality of block copolymer repeating units included in the lactide copolymer may be linked with each other via a linking group including the linear urethane linking group and the branched urethane linking group.

Due to the structure of the above-described block copolymer repeating unit and the linking form thereof, the lactide copolymer may exhibit characteristics as below.

First, the lactide copolymer may include the soft segments of the polyether polyol repeating units to exhibit excellent flexibility, and as described above, there is little possibility in which the soft segments are discharged while being processed or used, due to the above-described linking structure. In addition, due to the linking structure, the lactide copolymer and the oriented film according to an exemplary embodiment, may have larger molecular weight and excellent mechanical physical properties, and may also easily control general physical properties.

In addition, in the lactide copolymer, the plurality of block copolymer repeating units as described above may be linked with each other via a urethane linking group including both of the linear urethane linking group and the branched urethane linking group. In this case, the lactide copolymer may include linear copolymer chains and branched copolymer chains at the same time. As a result, the lactide copolymer may have a larger molecular weight and high melting viscosity even at the same molecular weight, and therefore, more excellent mechanical physical properties and melting processability may be exhibited. In addition, the oriented film including the lactide copolymer according to an exemplary embodiment of the present invention may satisfy the above-described slope range of the stress-strain curve and may exhibit more excellent flexibility. Therefore, at the time of manufacturing the oriented film according to an exemplary embodiment by melting and processing the lactide copolymer and the composition including the same, significantly excellent processability may be provided, and the oriented film may exhibit significantly excellent flexibility and mechanical physical properties, and the like.

When the urethane linking group includes only the branched urethane linking groups (for example, the urethane linking group is induced from the polyvalent isocyanate compound having more than 3 equivalents of an average isocyanate group per a molecule), the lactide copolymer may have extremely increased molecular weight, which forms a gel, and therefore, it is difficult to actually perform processes. In this case, processability for obtaining the oriented film according to an exemplary embodiment, and the like, may be deteriorated. In addition, when the urethane linking group includes only the linear urethane linking groups (for example, the urethane linking group is induced from the diisocyanate compound having 2 equivalents of an average isocyanate group per a molecule), it is difficult for the oriented film according to an exemplary embodiment to satisfy the above-described slope range of the stress-strain curve, and as a result, relatively poor flexibility may be exhibited.

Meanwhile, the polyvalent isocyanate compound for forming the above-described urethane linking group may include a mixture of the diisocyanate compound and the polyvalent isocyanate compound having 3 or more equivalents of an isocyanate group, in order to satisfy the equivalent range of more than about 2, or more than about 2 to less than 3 as described above.

Here, specific examples of the diisocyanate compound may include ethylene diisocyanate, 1,4-tetramethylene diisocyanate, 1,6-hexamethylene diisocyanate (HDI), 1,2-dodecane diisocyanate, cyclohexane-1,3-diisocyanate, cyclohexane-1,4-diisocyanate, 2,4-hexahydrotoluene diisocyanate, 2,6-hexahydrotoluene diisocyanate, hexahydro-1,3-phenylene diisocyanate, hexahydro-1,4-phenylene diisocyanate, perhydro-2,4-diphenylmethane diisocyanate, perhydro-4,4'-diphenylmethane diisocyanate, 1,3-phenylene diisocyanate, 1,4-phenylene diisocyanate, 1,4-stilbene diisocyanate, 3,3'-dimethyl-4,4'-diphenylene diisocyanate, toluene 2,4-diisocyanate (TDI), toluene 2,6-diisocyanate, diphenylmethane-2,4'-diisocyanate (MDI), diphenylmethane-2,2'-diisocyanate, diphenylmethane-4,4'-diisocyanate and naphthylene-1,5-diisocyanate, and the polyvalent isocyanate compound having 3 or more equivalents of the isocyanate group may be selected from the group consisting of an oligomer of the diisocyanate compound, a polymer of the diisocyanate compound, a cyclic polymer of the diisocyanate compound, hexamethylene diisocyanate isocyanurate (HDI isocyanurate), a triisocyanate compound and isomers thereof.

In addition, in the structure of the above-described lactide copolymer, the soft segment of the polyether polyol repeating unit included in the block copolymer repeating unit represented by Chemical Formula 1 may be a repeating unit derived from a polyether polyol polymer, for example, a C2 to C8 polyalkylene glycol. More specifically, the polyether polyol repeating unit may be a polyalkylene glycol repeating unit selected from the group consisting of a polyethylene glycol (PEG) repeating unit, a poly (1,2-propylene glycol) repeating unit, a poly (1,3-propanediol) repeating unit, and a polytetramethylene glycol repeating unit, more preferably, may be a poly (1,2-propylene glycol) repeating unit or a poly (1,3-propanediol) repeating unit.

In the lactide copolymer according to an exemplary embodiment of the present invention, each of the block copolymer repeating units represented by Chemical Formula 1 above may have a weight average molecular weight of about 50,000 to 200,000, or about 70,000 to 180,000, and the lactide copolymer having the plurality of copolymer repeating units linked with each other may have a weight average molecular weight of about 100,000 to 1,000,000, or about 100,000 to 500,000. The lactide copolymer may have a large molecular weight as described above, such that the oriented film including the lactide copolymer according to an exemplary embodiment may exhibit more excellent mechanical physical properties such as strength, and the like.

In addition, each of the polyether polyol repeating units included in the lactide copolymer may have a number average molecular weight of about 1,000 to 10,000, or about 2,000 to 9,000, or about 3,000 to 8,000. The polyether polyol repeating unit having the above-described range of the large molecular weight is included as the soft segment, such that the lactide copolymer and the oriented film including the lactide copolymer according to an exemplary embodiment may exhibit and maintain more excellent flexibility, and due to the large molecular weight of the lactide copolymer, the oriented film according to an exemplary embodiment of the present invention may exhibit excellent mechanical physical properties.

In addition, in the above-described lactide copolymer, each of the block copolymer repeating units may include about 50 to 95 wt % or about 60 to 90 wt % of the hard segment and a residual amount of the soft segment, for example, about 5 to 50 wt % or about 10 to 40 wt % of the soft segment. If the content of the hard segment is extremely low, the lactide copolymer and the oriented film including the same may have deteriorated mechanical physical properties such as strength, and the like. On the contrary, when the content of the hard segment is extremely increased or the content of the soft segment is extremely decreased, the lactide copolymer may have deteriorated flexibility, such that an effect that flexibility of the composition including the lactide copolymer is improved may not be sufficiently exhibited. In addition, if the content of the soft segment is extremely increased, mechanical physical properties may also be significantly decreased due to degradation of the lactide copolymer. It is considered that the reason is because the soft segment functions as a kind of initiator to promote depolymerization or degradation of the lactide copolymer, in particular the hard segment of the polylactide repeating unit.

Meanwhile, the above-described lactide copolymer may be obtained by ring opening polymerization of a lactide monomer using a specific catalyst, in the presence of a macro initiator of the polymer consisting of the polyether polyol repeating units. The specific catalyst may be an organic metal composite represented by Chemical Formula 2 below or a catalyst including a mixture of a compound represented by Chemical Formula 3 below and a compound represented by Chemical Formula 4 below:

[Chemical Formula 2]

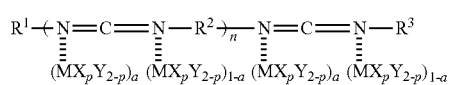

[Chemical Formula 3]

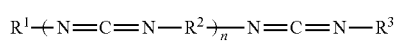

[Chemical Formula 4]

$$MX_pY_{2-p}$$

In Chemical Formula 2 to 4 above, $R^1$ and $R^3$ may be the same as or different from each other, and are each hydrogen, substituted or unsubstituted C3 to C10 alkyl, substituted or unsubstituted C3 to C10 cycloalkyl, substituted or unsubstituted C6 to C10 aryl, $R^2$ is substituted or unsubstituted C3 to C10 alkylene, substituted or unsubstituted C3 to C10 cycloalkylene, substituted or unsubstituted C6 to C10 arylene, X and Y are each independently an alkoxy group or a carboxyl group, n is an integer of 0 to 15, p is an integer of 0 to 2, and M is Sn or Zn.

The hard segments may be formed by ring opening polymerization of the lactide monomer using the catalyst, and may be copolymerized with the soft segments derived from the macro-initiator to obtain the block copolymer repeating units, and the block copolymer repeating units may be linked with each other to prepare the lactide copolymer according to an exemplary embodiment of the present invention as described above.

However, the specific catalyst may have significantly excellent polymerization activity as compared to the existing materials, which allows the polylactide repeating unit having a large molecular weight to be prepared even with a small amount of the specific catalyst. Therefore, the lactide copolymer may have a large molecular weight of the hard segments and the soft segments and may have the above-described large weight average molecular weight due to the structure in which the block copolymer repeating units represented by Chemical Formula 1 above are linked with each other. Therefore, the lactide copolymer and the oriented film including the same according to an exemplary embodiment of the present invention may exhibit excellent mechanical physical properties.

The above-described lactide copolymer includes two or more of the block copolymer repeating units including [the hard segment]-[soft segment]-[hard segment] consisting of [the polylactide repeating unit]-[the polyether polyol repeating unit]-[the polylactide repeating unit] to exhibit specific biodegradability of a biomass-based resin. In addition, the polyether polyol repeating unit of the soft segment is formed from the polyether polyol polymer derived from the biomass, for example, polyalkylene glycol having about 100% of biodegradability based on ASTM D6400 experimental method, such that the lactide copolymer may exhibit higher biodegradability. Due to the biodegradability of the lactide copolymer, and the like, the oriented film according to an exemplary embodiment may also exhibit excellent biodegradability.

Meanwhile, the above-described lactide copolymer may be prepared by a preparing method including: forming the block copolymer represented by Chemical Formula 1a by ring opening polymerization of the lactide monomer in the presence of a tin- or zinc-containing catalyst and an initiator including a polyether polyol polymer; and reacting the block copolymer represented by Chemical Formula 1a with a polyvalent isocyanate compound having 2 or more equivalents of an isocyanate group per a molecule:

[Chemical Formula 1]

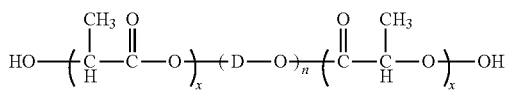

in Chemical Formula 1a, D is a C2 to C10 linear or branched alkylene group, x is each independently an integer of 30 to 500, and n is an integer of 30 to 1000.

According to the preparing method, in a first step, the hard segments of polylactide repeating units are formed and bound to the soft segment derived from the initiator of the predetermined number of polyether polyol polymers, thereby preparing the block copolymer represented by Chemical Formula 1a, and in a second step, the block copolymer is bound to the polyvalent isocyanate compound to prepare the lactide copolymer.

Here, the polyether polyol copolymer functions as a kind of macro-initiator at the time of forming the polylactide repeating unit which is the hard segment. That is, the macro-initiator may be bound to the lactide monomer with the organic metal catalyst to initiate the ring opening reaction, and the chains may be continuously extended to form the hard segments and the block copolymer including the same. That is, since the hydroxy groups at both ends of the polyether polyol polymer serve to initiate the ring opening polymerization and extend the chains, the block copolymer formed therefrom may have a structure in which the hard segments are bound to both ends of the polyether polyol polymer, that is, the soft segment.

Therefore, the block copolymer formed as described above may react with the polyvalent isocyanate compound to prepare the lactide copolymer included in the oriented film according to an exemplary embodiment of the present invention.

In the preparing method, the tin- or zinc-containing catalyst may be the organic metal composite represented by Chemical Formula 2 as described above or the catalyst including the mixture of a compound represented by Chemical Formula 3 and a compound represented by Chemical Formula 4. By using the specific catalyst, the finally prepared lactide copolymer may satisfy a high molecular weight range, and the like. As a result, the lactide copolymer and the oriented film including the same according to an exemplary embodiment may exhibit improved flexibility, and the like, due to the inclusion of the soft segment, together with excellent mechanical physical properties.

In the above-described preparing method of the lactide copolymer, L-lactide or D-lactide which is a cyclic monomer obtained from L-polylactic acid or D-polylactic acid may be used as the lactide monomer. More preferably, as the lactide monomer, it is preferable to use L-lactide or D-lactide raw materials having an optical purity of 98% or more in view of a melting temperature and thermal resistance of the lactide copolymer.

In addition, as the polyether polyol polymer, C2 to C8 polyalkylene glycol having a number average molecular weight of about 1,000 to 10,000, or about 2,000 to 9,000, or about 3,000 to 8,000 may be used, and specifically, may be polyalkylene glycol selected from the group consisting of polyethylene glycol (PEG), poly(1,2-propylene glycol), poly(1,3-propanediol), and polytetramethylene glycol.

In addition, the ring opening polymerization may be performed at a temperature of about 120 to 200° C., or about 120 to 190° C. for about 0.5 to 8 or about 1 to 7 hours.

Further, the composite represented by Chemical Formula 2 or the mixture of Chemical Formulas 3 and 4 may be used as the catalyst in the ring opening polymerization, wherein the catalyst may be used at a ratio of about 1:10,000 to 1:200,000 (mole/mole ratio) based on the lactide monomer. It an addition ratio of the catalyst is extremely decreased, the polymerization activity is not sufficient which is not preferable, and on the contrary, if an addition ratio of the catalyst is extremely increased, the residual catalyst amount of the prepared lactide copolymer is increased, which may cause degradation or decrease in a molecular weight of the copolymer, and the like.

In addition, in the step of reacting the block copolymer with the polyvalent isocyanate compound after the ring opening polymerization, an isocyanate compound having more than about 2 equivalents or more than about 2 to less than 3 equivalents of an isocyanate group may be used as the polyvalent isocyanate compound, which is the same as described above, and therefore, more details thereof will be omitted.

Further, the polyvalent isocyanate compound may be used in an amount of about 0.05 to 5 parts by weight, or about 0.1 to 4 parts by weight, or about 0.2 to 2 parts by weight based on 100 parts by weight of the block copolymer represented by Chemical Formula 1a above. When the amount of the used polyvalent isocyanate compound is extremely decreased, the molecular weight, the viscosity or the mechanical physical properties of the lactide copolymer may not be sufficiently obtained, and on the contrary, when the amount there of is extremely increased, gel may be formed due to the excessively increased molecular weight of the lactide copolymer.

Further, the reaction with the polyvalent isocyanate compound may be performed at a temperature of about 100 to 190° C. for about 0.001 to 1 hour. However, the reaction condition is not specifically limited as long as it is general reaction conditions forming the urethane bond.

In addition, the reaction with the polyvalent isocyanate compound may be performed in the presence of a tin-based catalyst. Representative examples of the tin-based catalyst may include stannous octoate, dibutyltin dilaurate, dioctyltin dilaurate, and the like.

Meanwhile, when measuring and deducing the stress-strain curve of the oriented film including the lactide copolymer according to an exemplary embodiment of the present invention, a slope of the stress-strain curve at the section having a strain of about 0 to 16% may be about 0.5 to 1.1, or about 0.7 to 1.0, or about 0.8 to 0.95. In addition, the oriented film may be fractured at a significantly higher strain, for example, the strain of about 40% or more, or about 50 to 130%, or about 60 to 100%, as compared to oriented films of the polylactide-based resin known in the related art, and the slope of the stress-strain curve at a section having the strain of about 20% to a fracture point may be about 0.01 to 0.08, or about 0.03 to 0.075, or about 0.04 to 0.07.

Here, the stress-strain curve of the oriented film may be measured and deduced by Universal Testing Machine (UTM) (manufactured by Instron) according to ASTM D 882, and the above-described slope characteristic may be calculated by linear regression of the curve at the specific strain section of the stress-strain curve. Examples of the measured slope are shown in FIGS. 3 and 4, respectively.

As described above, in the entire strain section including the initial strain section, the slope of the stress-strain curve has a generally small value, and in addition, the film is fractured under significantly large strain, such that the oriented film according to an exemplary embodiment may exhibit significantly high elongation as compared to the oriented film of the polylactide-based resin known in the art. Further, the oriented film satisfying these characteristics according to an exemplary embodiment may exhibit excellent flexibility to solve problems of the film of the existing polylactide-based resin and may be significantly preferably usable as a packaging film, and the like.

The oriented film according to an exemplary embodiment of the present invention may have various thicknesses according to each usage, such as about 10 to 200 μm, or about 10 to 100 μm. For example, when the oriented film is used as the packaging films such as a wrap film, a bag, or the like, the films may have a thickness of about 10 to 50 μm, or about 10 to 30 μm, or about 15 to 25 μm in view of flexibility, handling, and strength.

In addition, when a tensile test is conducted on the packaging film by using UTM (manufactured by Instron), the tensile strength may be about 50 to 90 MPa, or about 60 to 80 MPa, the elongation may be about 40 to 150%, or about 60 to 130%, or about 60 to 100%, the modulus may be about 200 to 450 MPa, or about 220 to 400 MPa, or about 230 to 350 MPa.

These ranges of the tensile strength, elongation, and modulus may reflect excellent flexibility and mechanical physical properties of the oriented film. In addition, the oriented film includes the lactide copolymer as described above, such that the film may not be easily torn due to biaxial orienting impact during the manufacturing process or rustle of the film may not occur but the film may be easily manufactured and used.

When the tensile strength of the oriented film is extremely low, spread or looseness may occur during a process of forming and processing the film, and handling, process transparency, and slit processability may be deteriorated. In addition, at the time of using a wrap film, releasing property may not be sufficient due to a lack of slip property, or it may be difficult to effectively package since film is changed before surrounding articles such as a container, and the like, or food products. On the contrary, when the tensile strength is extremely increased, at the time of packaging, the film may be folded to make a folding line as it is, which may have a negative effect on appearance, or the film may not be changed according to shapes of the articles or food products for packaging, which may cause difficulty for packaging.

In addition, when the elongation is extremely low or the modulus is extremely high, flexibility may not be sufficient and effective packaging as a container or the food packaging film may not be easily conducted. On the contrary, when the elongation is extremely high or the modulus is extremely low, spread or looseness may occur during a process of forming and processing the film, and handling, process transparency, and slit processability may be deteriorated and handling of the film may be poor, and the film may be easily fractured even after the packaging, which may cause damage on materials of the packages.

In addition, the oriented film may provide characteristics required as the food packaging materials, such as heat sealability, barrier property of a gas such as water vapor, oxygen, carbon dioxide, or the like, releasing property, printability, and the like, as needed at a range in which the effects are not suppressed. To this end, the polymer or the compound having the above-described properties may be mixed with the film or thermoplastic resins such as an acrylic resin, a polyester resin, a silicone-based resin, and the like, or an antistatic agent, a surfactant, a release agent, and the like, may be applied onto at least one surface of the oriented film. In addition, as an another method, other films having functions such as a polyolefin-based sealant, and the like, may be co-extruded to be manufactured as a multilayer film. The multilayer film may be manufactured by other methods such as adhesion, lamination, and the like.

Meanwhile, the above-described oriented film may be a uniaxially oriented film or a biaxially oriented film in a general form, and the oriented film may be formed by a general uniaxial orientation method, a sequential biaxial orientation method, a simultaneous biaxial orientation method, or the like, according to each form. In addition, a heat-setting process after the orientation process may be added. A process of forming the oriented film may be performed by sheet-shaped melting and extruding the lactide copolymer by an extruder provided with T-die, cooling and solidifying the sheet-shaped melted and extruded lactide copolymer to obtain a non-oriented film, and then orienting the non-oriented film in length and width directions.

The orientation condition of the film may be appropriately controlled according to heat shrinkage characteristics, dimensional stability, strength, Young's modulus, and the like. For example, the orienting temperature may be preferably controlled to be above a glass transition temperature and below a crystallization temperature of the lactide copolymer in view of strength and flexibility of the finally manufactured oriented film. In addition, orienting ratios may have a range of about 1.5 to 10 times in length and width directions, respectively, and the orienting ratios in length and width directions may be controlled to be different from each other.

After the uniaxial orientation or the biaxial orientation is performed by the above-described method, the oriented film is finally manufactured by a heat-setting process, wherein the heat-setting process may be treated at a temperature of about 100° C. or more for about 10 seconds or more for strength, dimensional stability of the film.

The above-described oriented film may be preferably applied as packaging films for various fields. For example, the oriented film manufactured by using the lactide copolymer according to the present invention may be widely used as industrial packaging materials such as agricultural mulching film, automotive protective film sheets, garbage bags, compost pockets, or the like, as well as living consumer goods, or grocery packaging papers/bags, chilled/frozen food packaging, shrinkable over-wrapping films, films for bundle, personal hygiene items such as sanitary pads or baby products, lamination films, and mat films for shrinkable label packaging and snack packing.

ADVANTAGEOUS EFFECTS OF INVENTION

Figure 1:
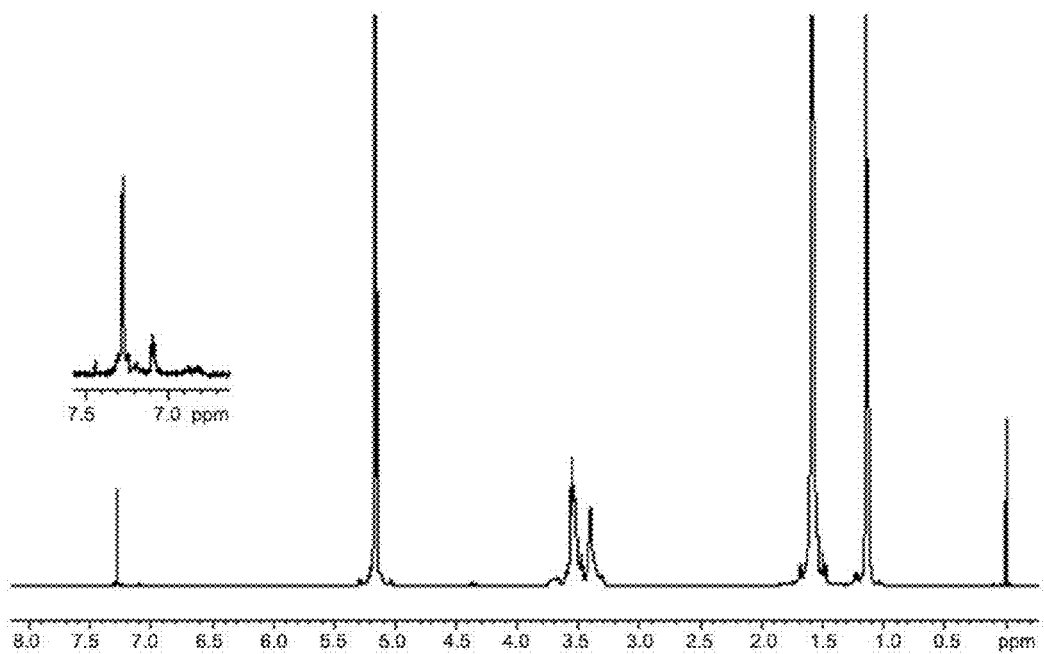
FIG. 1 is $^1$H NMR spectrum of a lactide copolymer of Preparation Example 1.

The oriented film according to the present invention may exhibit and maintain excellent mechanical physical properties and excellent flexibility, elongation, and the like, and may exhibit biodegradability. Therefore, the oriented film may be significantly preferably applied as various packaging films, such as a food packaging film, and the like.

EXAMPLES

Hereinafter, actions and effects of the present invention will be described in more detail by specific examples of the present invention. Meanwhile, the Examples are provided only to illustrate the present invention, and the scope of the invention is not limited thereto.

[Experimental Method]

In the following Preparation Examples and Examples, all operations dealing with compounds sensitive to air or water were carried out using standard Schlenk technique or dry box techniques. In addition, definition and measuring methods of each physical property in Preparation Examples and Examples to be described below are summarized below.

(1) Content (wt %) of Polylactide and Polyether Polyol Repeating Units Contents of each repeating unit in the block copolymer repeating units included in each prepared lactide copolymer are weighed through $^1$H NMR using 600 Mhz nuclear magnetic resonance (NMR) spectrometer.

(2) Tg and Tm(° C.): By using a differential scanning calorimeter (manufactured by TA Instruments), samples were melted and rapidly cooled and then Tg and Tm thereof were measured while increasing a temperature at 10° C./min. A mid value of a baseline and each tangent around an endothermic curve was determined as Tg and a max value temperature of a melting endothermic peak of a crystal was determined as Tm.

(3) Molecular Weight and Polydispersity Index: A molecular weight and a polydispersity index (PDI) of the polymer were measured by using gel permeation chromatography (GPC), wherein a polystyrene sample was used as a standard one.

(4) Preparation of Sample

In order to manufacture a T-die film, all samples were dried in a vacuum oven at 70° C. for 4 hours before performing an extrusion and molding process, and were sheet-shaped extruded at an extrusion temperature of 190° C. by a twin screw extruder (BAUTEK L40/D19 Twin Screw 19φ) having a diameter of 19φ and mounted with T-die (BAUTEK Mini T-die). The film was casted on a drum cooled to a temperature of 30 to 50° C. to manufacture a non-oriented film. After the non-oriented film was oriented in a length direction between heating roll under conditions of an orientation temperature of 72° C. and a biaxial orienting ratio of 3*4, and the film oriented in a length direction was fixed by a clip, then oriented in a width direction in a tenter, and heat treatment was performed at 120° C. for 60 seconds in a state in which the film was fixed in a width direction. Therefore, a biaxially oriented film having a thickness of 20 um was obtained. The biaxially oriented film was used as a measuring sample in UTM according to ASTM D 412-C standard.

(5) Tensile Strength (TS max, MPa) and Stress-Strain Curve: A tensile test was conducted on the manufactured film sample at a orientation rate of 10 mm/min by using UTM manufactured by Instron according to ASTM D 882 to deduce a stress-strain curve, and tensile strength was measured. Here, Load Cell 10KN, LE position 40 mm was applied as a condition for the tensile test, and an average value of total values obtained by conducting the measuring experiment 5 times was represented as a result value.

(6) Elongation (%): Elongation when the film sample was cut was measured under the same condition as the tensile strength measured above and an average value of total values obtained by performing the measuring experiment 5 times was represented as a result value.

(7) E-modulus (MPa): A slope of an initial section having a strain of about 0.5% on the stress-strain curve was calculated by using UTM. Conditions for tensile test was the same as the conditions for measuring the tensile strength and an average value of total values obtained by performing the measuring experiment 5 times was represented as a result value.

Synthesis Example 1

$Sn(Oct)_2$ (Aldrich Col.) (0.2 g, 0.49 mmol) and a compound represented by Chemical Formula 6 below (TCI Co.) (0.36 g, 1.0 mmol) were put into a 100 mL flask, respectively, toluene (30 mL) was added thereto, and stirred at 100° C. for 1 hour. Then, after a solvent was removed under vacuum, the obtained product was washed with a heptane solvent and dried to obtain 0.36 g of an organic metal composite A.

[Chemical Formula 6]

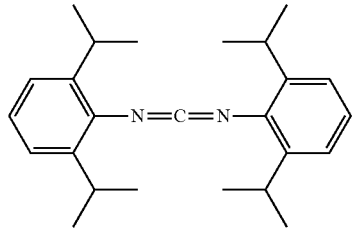

Synthesis Example 2

$Sn(Oct)_2$ (0.2 g, 0.49 mmol, $Sn(Oct)_2$ (Aldrich Co.) (0.2 g, 0.49 mmol) and a compound represented by Chemical Formula 7 below (LineChemi Co.) (0.36 g) were put into a 100 mL flask, respectively, to obtain 0.4 g of an organic metal composite B by the same method as Synthesis Example 1.

Referring to $^{13}C$ NMR spectrum with respect to the organic metal composite B, three carbonyl peaks in the reaction of the $Sn(Oct)_2$ catalyst and the compound represented by Chemical Formula 7 were shown at δ 188, 183, and 182 ppm, wherein the significantly sharp peak shown at δ 183 ppm corresponds to Oct-H acid compound bound to the compound represented by Chemical Formula 7, the wide peak shown at δ 188 ppm corresponds to free $Sn(Oct)_2$, and the wide peak shown at δ 182 ppm corresponds to the organic metal composite having the coordinated compound represented by Chemical Formula 7:

[Chemical Formula 7]

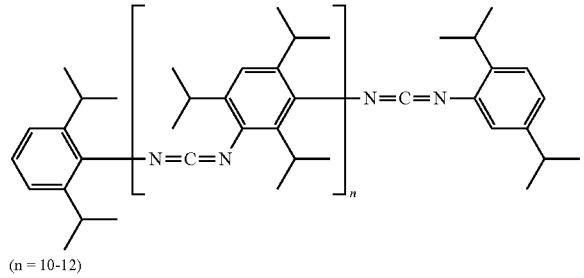

(n = 10-12)

Preparation Example 1

An L-lactide monomer (100 kg, 693.82 mol) and the organic metal composite A (102.81 g) prepared in Synthesis Example 1 were put into a 150 L reactor provided with a nitrogen-introducing tube, a stirrer, a catalyst inlet and a vacuum system, then polypropylene glycol (a number average molecular weight of 6,000 g/mol, 17.65 kg) was put thereinto, followed by ring opening polymerization reaction at a temperature of 180° C. for 3 hours, to prepare a block copolymer represented by Chemical Formula 1a. Some polymerization resins were sampled in a reactor and a weight average molecular weight thereof was measured by gel permeation chromatography (GPC), wherein the weight average molecular weight was 95,000.

Then, 0.59 kg of a polyvalent isocyanate compound (a mixture of MDI having 2.0 equivalents of an isocyanate group and hexamethylene diisocyanate isocyanurate having 3.0 equivalents of an isocyanate group) having about 2.7 equivalents of an average isocyanate group per a molecule was put into a polymerization reactor, followed by an additional polymerization reaction with the block copolymer represented by Chemical Formula 1a at a temperature of 180° C. for 30 minutes to form a urethane linking group.

After the reaction was completed, residual lactide was removed by general volatilization process to prepare a lactide copolymer including two or more of the block copolymer repeating units represented by Chemical Formula 1. Then, contents (wt %) of polylactide and polyether polyol repeating units, a weight average molecular weight, a polydispersity index, a glass transition temperature, and a melting temperature with respect to the prepared lactide copolymer were measured. As a measuring result, it was confirmed that the contents of the polylactide and polyether polyol repeating units of the block copolymer repeating units were 85 wt % and 15 wt %, respectively, the weight average molecular weight (Mw) was 244,000, the polydispersity index was 2.57, Tg was 48° C., and Tm was 169° C. In addition, $^1H$ NMR spectrum of the lactide copolymer of Preparation Example 1 is shown in FIG. 1.

Preparation Example 2

A lactide copolymer of Preparation Example 2 was prepared by the same method as Preparation Example 1 except for using polypropylene glycol having a molecular weight of 4,000 g/mol (PDI 1.2) instead of using polypropylene glycol having a number average molecular weight of 6,000 g/mol. Contents (wt %) of polylactide and polyether polyol repeating units, a weight average molecular weight, a polydispersity index, a glass transition temperature, and a melting temperature with respect to the prepared lactide copolymer were measured. As a measuring result, it was confirmed that the contents of the polylactide and polyether polyol repeating units of the block copolymer repeating units were 85 wt % and 15 wt %, respectively, the weight average molecular weight (Mw) was 198,000, the polydispersity index was 2.34, Tg was 47° C., and Tm was 167° C.

Preparation Example 3

A lactide copolymer of Preparation Example 3 was prepared by the same method as Preparation Example 1 except for using polypropylene glycol in an amount of 11.5 kg. Contents (wt %) of polylactide and polyether polyol repeating units, a weight average molecular weight, a polydispersity index, a glass transition temperature, and a melting temperature with respect to the prepared lactide copolymer were measured. As a measuring result, it was confirmed that the contents of the polylactide and polyether polyol repeating units of the block copolymer repeating units were 90 wt % and 10 wt %, respectively, the weight average molecular weight (Mw) was 256,000, the polydispersity index was 2.41, Tg was 51° C., and Tm was 167° C.

Example 1

The lactide copolymer ('F-PLA') prepared according to Preparation Example 1 was dried in a vacuum oven at 70° C. for 4 hours, and was sheet-shaped extruded at an extrusion temperature of 190° C. by a twin screw extruder (BAUTEK L40/D19 Twin Screw 19φ) having a diameter of 19φ and mounted with T-die (BAUTEK Mini T-die). The film was casted on a drum cooled to a temperature of 30 to 50° C. to manufacture a non-oriented film.

When the non-oriented film was oriented in a length direction between heating roll under conditions of an orientation temperature of 72° C. and a biaxial orienting ratio of 3*4, and the film oriented in a length direction was fixed by a clip, then oriented in a width direction in a tenter, and heat treatment was performed at 120° C. for 60 seconds in a state in which the film was fixed in a width direction. Therefore, a biaxially oriented film having a thickness of 20 um was obtained.

A stress-strain curve of the film of Example 1 was deduced and shown in FIG. 2, and a slope at a section having a strain of 0 to 16% and a slope at a section having a strain of 20% to a fracture point in the curve were measured and shown in FIGS. 3 and 4, and in Table 1 below, respectively.

Example 2

A biaxially oriented film of Example 2 was manufactured by using the same method as Preparation Example 1 except for using the lactide copolymer of Preparation Example 2 instead of using the lactide copolymer of Preparation Example 1.

A stress-strain curve of the film of Example 2 was deduced by the same method as Example 1, and a slope at a section having a strain of 0 to 16% and a slope at a section having a strain of 20% to a fracture point in the curve were measured, respectively, and shown in Table 1 below.

Example 3

A biaxially oriented film of Example 3 was manufactured by using the same method as Preparation Example 1 except for using the lactide copolymer of Preparation Example 3 instead of using the lactide copolymer of Preparation Example 1.

A stress-strain curve of the film of Example 3 was deduced by the same method as Example 1, and a slope at a section having a strain of 0 to 16% and a slope at a section having a strain of 20% to a fracture point in the curve were measured, respectively, and shown in Table 1 below.

Comparative Example 1

A polylactide resin (NatureWorks 4032D, 'PLA', weight average molecular weight of about 230,000, manufactured by NatureWorks) was used as Comparative Example 1. A polylactide resin film of Comparative Example 1 was manufactured by using the same method as Example 1, and then a stress-strain curve of the film of Comparative Example 1 was deduced and shown in FIG. 2, and a slope at a section having a strain of 0 to 16% and a slope at a section having a strain of 20% to a fracture point in the curve were measured and shown in FIGS. 3 and 4, and in Table 1 below, respectively.

Comparative Example 2

A biaxially oriented polypropylene film (Daelim; thickness of 20 um), that is, a petrochemical resin film which was mainly used as a packaging film in the related art was used as Comparative Example 2. A stress-strain curve of the film of Comparative Example 2 was deduced and shown in FIG. 2, and a slope at a section having a strain of 0 to 16% and a slope at a section having a strain of 20% to a fracture point in the curve were measured and shown in FIGS. 3 and 4, and in Table 1 below, respectively.

Comparative Example 3

A lactide copolymer was prepared by using the same method as Preparation Example 1 except for using MDI (0.59 kg) having 2.0 equivalents of an average isocyanate group per a molecule but without using hexamethylene diisocyanate isocyanurate. A biaxially oriented film of Comparative Example 3 was manufactured by using the same method as Preparation Example 1 except for using the lactide copolymer of Comparative Example 3 instead of using the lactide copolymer of Preparation Example 1.

A stress-strain curve of the film of Comparative Example 3 was deduced by the same method as Example 1, and a slope at a section having a strain of 0 to 16% and a slope at a section having a strain of 20% to a fracture point in the curve were measured, respectively, and shown in Table 1 below.

TABLE 1

|  | Modulus (MPa) | Tensile strength (MPa) | Elongation (Fracture Point; %) | Slope 1 (0-16%) | Slope 2 (20%-Fracture Point) |
|---|---|---|---|---|---|
| Comparative Example 1 | 417 | 85 | 22 | 1.382 | 0.002 |
| Comparative Example 2 | 156 | 80 | 134 | 0.165 | 0.047 |
| Comparative Example 3 | 324 | 57 | 39 | 1.243 | 0.013 |
| Example 1 | 251 | 76 | 86 | 0.935 | 0.066 |
| Example 2 | 231 | 74 | 96 | 0.832 | 0.054 |
| Example 3 | 283 | 80 | 75 | 0.981 | 0.051 |

Figure 2:
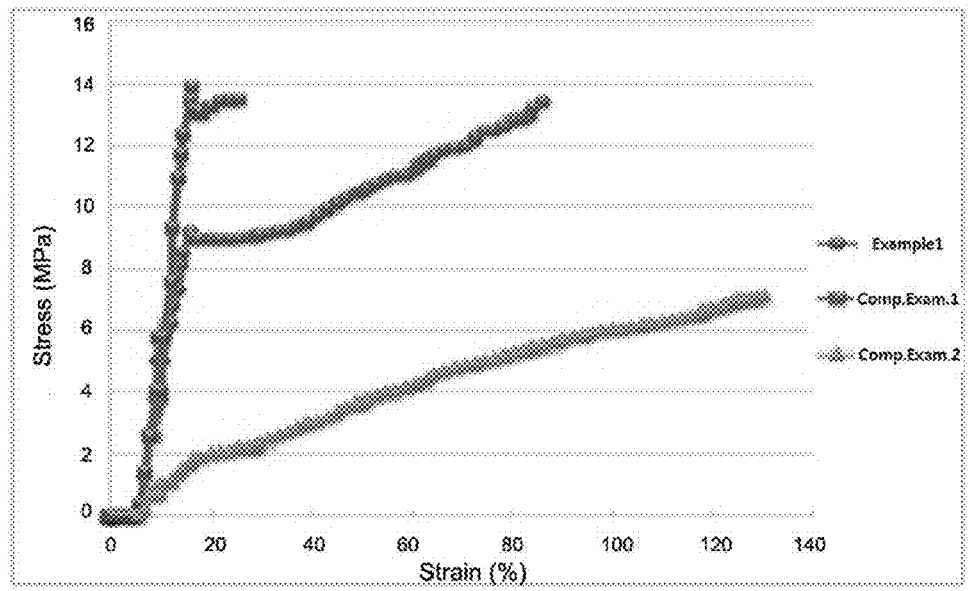
FIG. 2 is a graph illustrating comparison in a stress-strain curve of oriented films of Example 1, Comparative Example 1, and Comparative Example 2.
Figure 3:
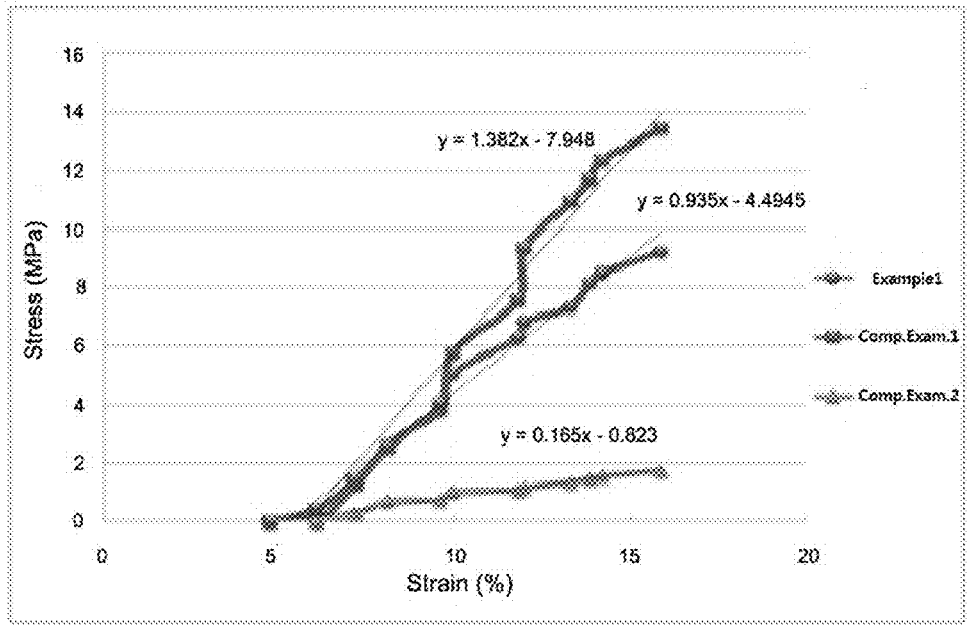
FIG. 3 is a graph illustrating comparison results obtained by measuring slopes at a section having a strain of 0 to 16% in a stress-strain curve of the oriented films of Example 1, Comparative Example 1, and Comparative Example 2.
Figure 4:
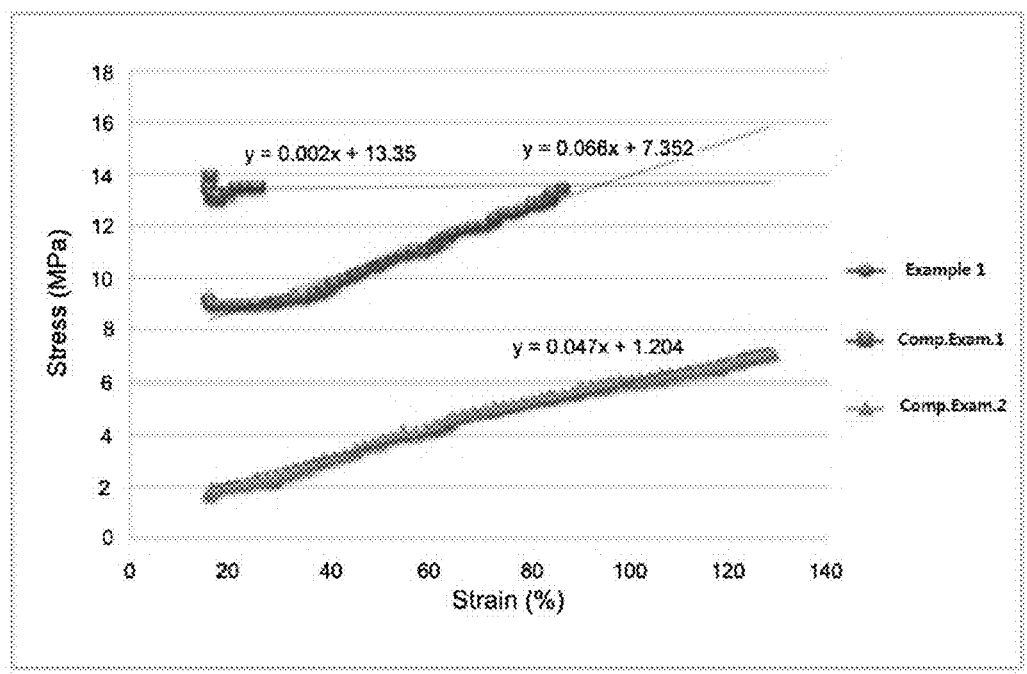
FIG. 4 is a graph illustrating comparison results obtained by measuring slopes at a section from a strain of 20% to a fracture point in a stress-strain curve of the oriented films of Example 1, Comparative Example 1, and Comparative Example 2.

Referring to Table 1 and FIGS. 2 to 4, it was confirmed that each film of Examples 1 to 3 had a slope at a section having a strain of 0 to 16% on the stress-strain curve of 0.832 to 0.981, which was lower than that of Comparative Examples 1 to 3, and had a strain at a fracture point of 75 to 96%, which was large, and the slope at a section having a strain of 20% to a fracture point of 0.051 to 0.066, and therefore, all films of Examples 1 to 3 satisfied the stress-strain slope characteristic of the present invention. It was confirmed that the films of Examples 1 to 3 had low modulus, high elongation, and excellent flexibility as compared to the film of Comparative Example 1 which is the existing polylactide-based resin film, or the film of Comparative Example 3 manufactured only by using the urethane linking group having 2 equivalents at the time of copolymerization.

In particular, it was confirmed that the film of Example 1 including the lactide-based copolymer exhibited biodegradability and also exhibited mechanical physical properties such as flexibility, tensile strength, and the like, which are similar to those of a petrochemical resin film of Comparative Example 2. Therefore, it is considered that the film of Example 1 solves the problems of the existing polylactide-based resin film and is significantly preferably usable as a packaging film, and the like.

The invention claimed is:

1. An oriented film comprising:
a lactide copolymer including two or more block copolymer repeating units in which hard segments of polylactide repeating units are bound to both ends of soft segments of polyether polyol repeating units, the block copolymer repeating units being represented by Chemical Formula 1, and being linked with each other,
wherein the block copolymer repeating units are linked with each other via a urethane linking group induced from a polyvalent isocyanate compound having 2.2 to 2.8 equivalents of an average isocyanate group per a molecule, the compound including a mixture of a diisocyanate compound and a polyvalent isocyanate compound having 3 or more equivalents of an isocyanate group,
wherein a slope of a stress-strain curve at a section having a strain of 0 to 16% is 0.5 to 1.1,
wherein the oriented film has an E-modulus of 200 to 450 MPa;

[Chemical Formula 1]

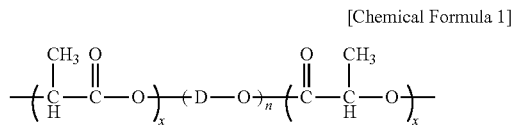

in Chemical Formula 1, D is a C2 to C10 linear or branched alkylene group, x is each independently an integer of 30 to 500, and n is an integer of 30 to 1000.

2. The oriented film of claim 1, wherein it is fractured at a strain of 40% or more, and a slope of the stress-strain curve at a section from a strain of 20% to a fracture point is 0.01 to 0.08.

3. The oriented film of claim 1, wherein the urethane linking group includes a urethane bond formed by reaction of a terminal hydroxy group derived from the polylactide repeating unit and the isocyanate group derived from the polyvalent isocyanate compound.

4. The oriented film of claim 1, wherein the diisocyanate compound is selected from the group consisting of ethylene diisocyanate, 1,4-tetramethylene diisocyanate, 1,6-hexamethylene diisocyanate, 1,2-dodecane diisocyanate, cyclohexane-1,3-diisocyanate, cyclohexane-1,4-diisocyanate, 2,4-hexahydrotoluene diisocyanate, 2,6-hexahydrotoluene diisocyanate, hexahydro-1,3-phenylene diisocyanate, hexahydro-1,4-phenylene diisocyanate, perhydro-2,4-diphenylmethane diisocyanate, perhydro-4,4'-diphenylmethane diisocyanate, 1,3-phenylene diisocyanate, 1,4-phenylene diisocyanate, 1,4-stilbene diisocyanate, 3,3'-dimethyl-4,4'-diphenylene diisocyanate, toluene 2,4-diisocyanate (TDI), toluene 2,6-diisocyanate, diphenylmethane-2,4'-diisocyanate (MDI), diphenylmethane-2,2'-diisocyanate, diphenylmethane-4,4'-diisocyanate and naphthylene-1,5-diisocyanate, and
the polyvalent isocyanate compound having 3 or more equivalents of the isocyanate group is selected from the group consisting of an oligomer of the diisocyanate compound, a polymer of the diisocyanate compound, a cyclic polymer of the diisocyanate compound, hexamethylene diisocyanate isocyanurate (HDI isocyanurate), a thisocyanate compound and isomers thereof.

5. The oriented film of claim 1, wherein the lactide copolymer has a weight average molecular weight of 100,000 to 1,000,000.

6. The oriented film of claim 1, wherein each of the block copolymer repeating units has a weight average molecular weight of 50,000 to 200,000.

7. The oriented film of claim 1, wherein the polyether polyol repeating unit is a polyalkylene glycol repeating unit selected from the group consisting of a polyethylene glycol (PEG) repeating unit, a poly(1,2-propylene glycol) repeating unit, a poly(1,3-propanediol) repeating unit, a polytetramethylene glycol repeating unit, and a polybutylene glycol repeating unit.

8. The oriented film of claim 1, wherein each of the polyether polyol repeating units has a number average molecular weight of 1,000 to 15,000.

9. The oriented film of claim 1, wherein the two or more block copolymer repeating units include 50 to 95 wt % of the hard segment and 5 to 50 wt % of the soft segment with respect to the total weight.

10. The oriented film of claim 1, wherein it has a tensile strength of 50 to 90 MPa and an elongation of 40 to 150%.

11. The oriented film of claim 1, wherein it has a thickness of 10 to 200 μm.

* * * * *